United States Patent
Aguilar et al.

(10) Patent No.: US 11,598,266 B2
(45) Date of Patent: Mar. 7, 2023

(54) LIQUID FUEL STEAM PURGE SYSTEM AND METHOD FOR GAS TURBINE ENGINE

(71) Applicant: General Electric Company, Schenectady, NY (US)

(72) Inventors: Jose Francisco Aguilar, Queretaro (MX); Francisco Javier Gomez, Queretaro (MX)

(73) Assignee: General Electric Company, Schenectady, NY (US)

( * ) Notice: Subject to any disclaimer, the term of this patent is extended or adjusted under 35 U.S.C. 154(b) by 80 days.

(21) Appl. No.: 17/129,742

(22) Filed: Dec. 21, 2020

(65) Prior Publication Data

US 2022/0195929 A1    Jun. 23, 2022

(51) Int. Cl.
*F02C 7/232*    (2006.01)

(52) U.S. Cl.
CPC .......... *F02C 7/232* (2013.01); *F05D 2220/32* (2013.01); *F05D 2260/602* (2013.01)

(58) Field of Classification Search
CPC .... F02C 9/18; F02C 9/29; F02C 7/232; F02C 3/32
See application file for complete search history.

(56) References Cited

U.S. PATENT DOCUMENTS

| | | | | |
|---|---|---|---|---|
| 5,054,279 | A * | 10/1991 | Hines | F01K 21/047 60/39.5 |
| 9,239,013 | B2 * | 1/2016 | Zhang | F02C 7/232 |
| 10,584,615 | B2 | 3/2020 | Scipio et al. | |
| 10,685,752 | B2 | 6/2020 | Liszkai | |
| 10,968,837 | B1 * | 4/2021 | Yeung | F02C 7/232 |
| 2005/0172635 | A1 * | 8/2005 | Carlson, Jr. | F02C 7/1435 60/39.511 |
| 2009/0165435 | A1 * | 7/2009 | Koranek | F23R 3/343 60/39.463 |
| 2013/0247580 | A1 * | 9/2013 | Morgan | F01D 9/023 415/168.1 |
| 2018/0094586 | A1 | 4/2018 | Simmons et al. | |
| 2018/0363552 | A1 * | 12/2018 | Zhang | F02C 3/24 |
| 2020/0263927 | A1 * | 8/2020 | Chudnovsky | F28B 9/00 |

FOREIGN PATENT DOCUMENTS

| | | |
|---|---|---|
| EP | 3029299 A1 | 6/2016 |
| KR | 20120020496 A | 3/2012 |

OTHER PUBLICATIONS

European Extended Search Report, EP Application No. 21214392.9, dated May 3, 2022, 8 pgs.

* cited by examiner

*Primary Examiner* — Todd E Manahan
*Assistant Examiner* — Thuyhang N Nguyen
(74) *Attorney, Agent, or Firm* — Fletcher Yoder, P.C.

(57) ABSTRACT

A system is provided with an ejector having an outer wall extending circumferentially about a flow path, wherein the outer wall has a throat section along the flow path, and a diverging section downstream from the throat section along the flow path. The ejector includes a gas inlet configured to supply a gas into the flow path, and a water inlet configured to supply water into the flow path. The ejector is configured to produce steam in response to mixing of the water and the gas along the flow path. The system also includes a controller configured to control flows of the gas and the water to produce the steam for a steam purge of a liquid fuel circuit.

20 Claims, 5 Drawing Sheets

LIQUID FUEL STEAM PURGE SYSTEM AND METHOD FOR GAS TURBINE ENGINE

BACKGROUND

The subject matter disclosed herein relates to gas turbine engines and, particularly, to fuel circuits of the gas turbine engines.

A gas turbine engine may include one or more fuel circuits, such as a liquid fuel circuit and a gas fuel circuit. Unfortunately, the heat generated by the gas turbine engine can cause coking in the liquid fuel circuit. If the liquid fuel circuit is not properly purged, then the coking can result in plugged fuel lines, valves, and fuel nozzles. As a result, the coking can result in undesirable downtime of the gas turbine engine. A need exists for an improved purging system for the liquid fuel circuit of the gas turbine engine.

BRIEF DESCRIPTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In a first embodiment, a system includes an ejector having an outer wall extending circumferentially about a flow path, wherein the outer wall has a throat section along the flow path, and a diverging section downstream from the throat section along the flow path. The ejector includes a gas inlet configured to supply a gas into the flow path, and a water inlet configured to supply water into the flow path. The ejector is configured to produce steam in response to mixing of the water and the gas along the flow path. The system also includes a controller configured to control flows of the gas and the water to produce the steam for a steam purge of a liquid fuel circuit.

In a second embodiment, a system includes a liquid fuel circuit and a steam purge system configured to purge the liquid fuel circuit with steam, wherein the steam purge system includes an ejector. The ejector includes an outer wall extending circumferentially about a flow path, wherein the outer wall has a throat section along the flow path, and a diverging section downstream from the throat section along the flow path. The ejector includes a gas inlet configured to supply a gas into the flow path, and a water inlet configured to supply water into the flow path. The ejector is configured to produce the steam in response to mixing of the water and the gas along the flow path.

In a third embodiment, a method includes controlling flows of a gas and water to an ejector of a steam purge system fluidly coupled to a liquid fuel circuit. The ejector includes an outer wall extending circumferentially about a flow path, wherein the outer wall has a throat section along the flow path, and the outer wall has a diverging section downstream from the throat section along the flow path. The ejector includes a gas inlet configured to supply the gas into the flow path, and a water inlet configured to supply water into the flow path. The ejector is configured to produce steam in response to mixing of water and the gas along the flow path. The method also includes opening a flow of the steam from the ejector to the liquid fuel circuit to purge the liquid fuel circuit.

BRIEF DESCRIPTION OF THE DRAWINGS

These and other features, aspects, and advantages of the present technology will become better understood when the following detailed description is read with reference to the accompanying drawings in which like characters represent like parts throughout the drawings, wherein.

DETAILED DESCRIPTION

One or more specific embodiments of the present technology will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

Figure 1:
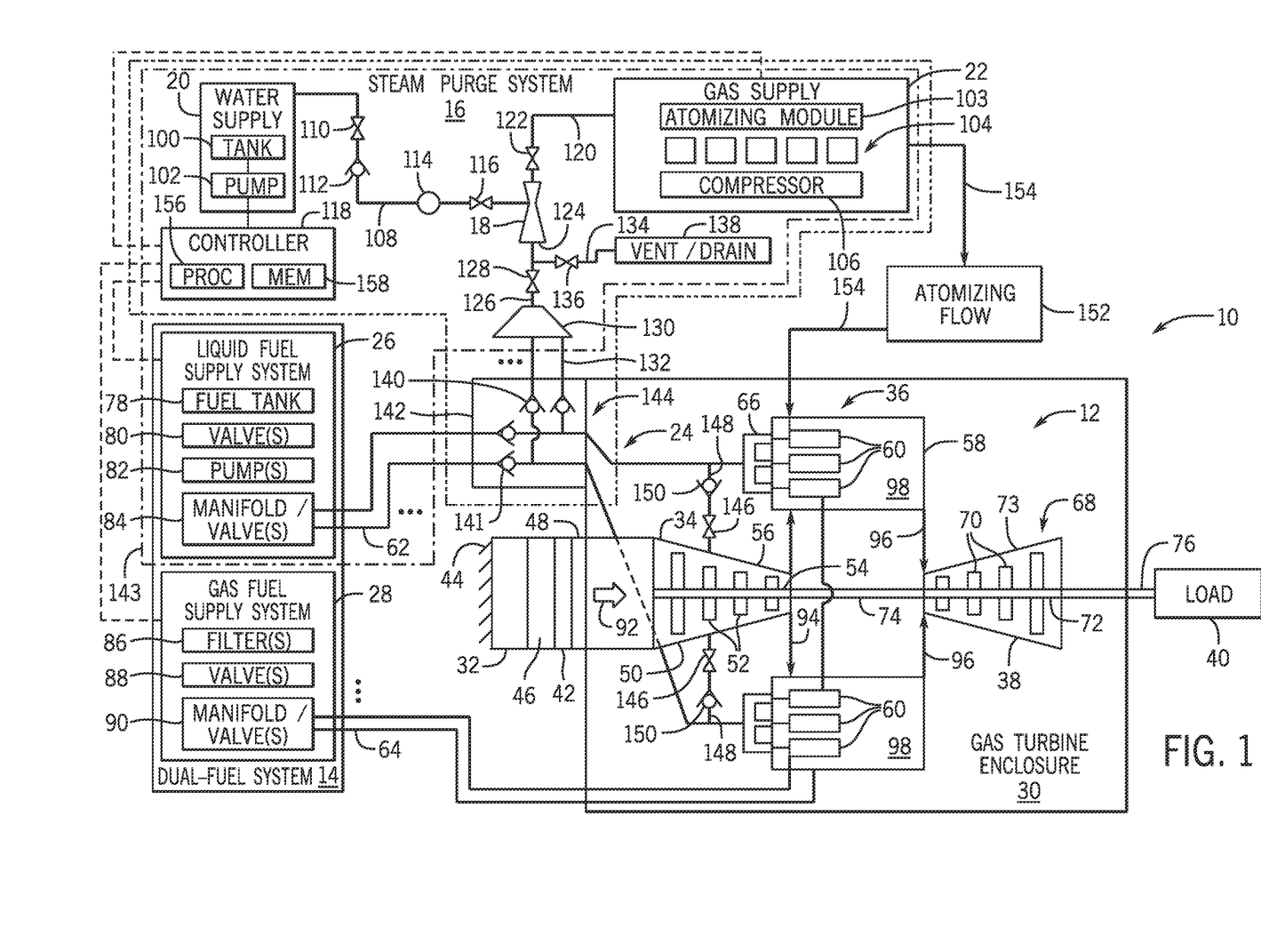
FIG. 1 is a schematic of an embodiment of a gas turbine system having a steam purge system to purge a liquid fuel circuit, wherein the steam purge system includes an ejector that combines water and a hot gas (e.g., hot compressed air) to generate steam to purge the liquid fuel circuit.

FIG. 1 is a schematic of an embodiment of a gas turbine system 10 having a gas turbine engine 12, a dual-fuel (supply) system 14, and a steam purge system 16. As discussed in further detail below, the steam purge system 16 includes an ejector 18 configured to receive water (e.g., a flow of water) from a water supply 20 and a gas (e.g., a hot compressed air) from a gas supply 22 and generate a flow of steam, such as a saturated steam, for use in purging a liquid fuel circuit 24 of the gas turbine system 10. For example, the ejector 18 of the steam purge system 16 may be configured to generate steam and supply the steam to the liquid fuel circuit 24 when switching between a liquid fuel supply system 26 and a gas fuel supply system 28 and/or when stopping operation of the liquid fuel supply system 26. The steam supplied through the liquid fuel circuit 24 is configured to purge the liquid fuel circuit 24 of any residual liquid fuel, thereby helping to reduce the possibility of coking in the liquid fuel circuit 24.

The illustrated gas turbine 10 include a gas turbine enclosure 30 housing the gas turbine engine 12. The gas turbine engine 12 includes an air intake section 32, a compressor section 34, a combustion section 36, a turbine section 38, and a load 40 (e.g., an electrical generator). The air intake section 32 includes an intake duct 42 having a plurality of intake louvers 44, one or more air filters 46, and one or more additional air treatment systems 48 (e.g., anti-icing systems, silencer baffles, etc.). The compressor section 34 includes a single stage or multi-stage compressor 50 having one or more stages of compressor blades 52 coupled to a compressor shaft 54 inside a compressor casing 56. For example, the compressor 50 may include between 1 and 28 compressor stages of compressor blades 52 coupled to the shaft 54. Each stage of the compressor 50 has a plurality of the compressor blades 52 arranged circumferentially about the shaft 54. The compressor section 34 outputs a compressed airflow 94 to the combustion section 36.

The combustion section 36 includes one or more combustors 58 having one or more fuel nozzles 60. For example, the combustion section 36 may include between two and fourteen combustors 58, wherein each combustor 58 includes between one and six fuel nozzles 60. As discussed and from the detail below, each fuel nozzle 60 is configured for dual-fuel operation (e.g., dual-fuel nozzles), such that the gas turbine engine 12 may be configured to selectively switch between liquid fuel operation via the liquid fuel supply system 26 and gas fuel operation via the gas fuel supply system 28. For example, the liquid fuel supply system 26 may be configured to supply liquid fuel to the fuel nozzles 60 via a plurality of liquid fuel lines 62, while the gas fuel supply system 28 may be configured to supply a gas fuel to the fuel nozzles 60 through a plurality of gas fuel lines 64. In the illustrated embodiment, the liquid fuel lines 62 extend from the liquid fuel supply 26 to a manifold 66 coupled to the fuel nozzle 60 of each combustor 58. Therefore, the fuel manifold 66 distributes the liquid fuel to each of the fuel nozzles 60 at each respective combustor 58. The gas fuel lines 64 may be coupled to the fuel nozzles 60 in a similar manner. The fuel nozzles 60 facilitate combustion of the fuel (e.g., liquid or gas fuel) in the combustors 58, which then output hot combustion gases 96 to the turbine section 38.

The turbine section 38 includes a single stage or multi-stage turbine 68 having one or more stages of turbine blades 70 coupled to a turbine shaft 72 within a turbine casing 73. For example, the turbine 68 may include between 1 and 8 turbine stages of turbine blades 70 coupled to the shaft 72. Each stage of the turbine 68 has a plurality of the turbine blades 70 arranged circumferentially about the shaft 72. The turbine 68 and the compressor 50 are rotationally coupled together via an intermediate shaft 74, which connects with the shafts 54 and 72. Additionally, the load 40 is rotationally coupled to the turbine 68 via a shaft 76. In certain embodiments, one or more of the shafts 54, 72, 74, and 76 may be integrated together as a common shaft. Also, in certain embodiments, the load 40 may be rotationally coupled to the gas turbine engine 12 at the compressor 50 end of the gas turbine engine 12, rather than the turbine 68 end of the gas turbine engine 12. The gas turbine enclosure 30 generally surrounds and contains the entirety of the gas turbine engine 12, including the compressor section 34, the combustion section 36, and the turbine section 38. However, the dual-fuel system 14, the steam purge system 16, and the load 40 are generally disposed outside of the gas turbine enclosure 30.

The dual-fuel system 14 includes a variety of tanks, pipelines, valves, pumps, manifolds, filters, and other supporting equipment to supply both liquid and gaseous fuels to the gas turbine engine 12. In the illustrated embodiment, the liquid fuel supply system 26 may include one or more fuel tanks 78, one or more valves 80, one or more pumps 82, and one or more manifolds and distribution valves 84. The one or more pumps 82 are configured to force a flow of a liquid fuel from the fuel tanks 78, while the valves 80 are configured to open and close the flow from the fuel tanks 78, and the manifolds and valves 84 are configured to distribute the liquid fuel flow through the plurality of liquid fuel lines 62 to the various combustors 58 and fuel nozzles 60.

Similarly, the gas fuel supply system 28 may include one or more fuel filters 86, one or more valves 88, and one or more manifolds and distribution valves 90. The gas fuel supply system 28 also may include one or more fuel storage units, such as fuel tanks and/or pipelines. The gas fuel provided by the fuel tanks and/or pipelines may be pressurized, such that the gas fuel supply system 28 is configured to control the flow of the gas fuel by opening and closing the valves 88 and allowing the gas flow to pass through the manifolds and distribution valves 90 to the various fuel nozzles 60 through the plurality of gas fuel lines 64.

In operation, the gas turbine engine 12 receives an air flow 92 through the air intake section 32, compresses the air flow 92 in one or more stages of compressor blades 52 in the compressor section 34, and directs the compressed airflow 94 into the combustors 58 of the combustion section 36. The engine 12 then mixes the compressed airflow 94 with fuel (e.g., liquid fuel from the liquid fuel supply system 26 and/or gas fuel from the gas fuel supply system 28) in each of the fuel nozzles 60, ignites the fuel-air mixture and generates hot combustion gases 96 in a combustion chamber 98 of each combustor 58, and outputs the hot combustion gases 96 to the turbine section 38. The engine 12 flows the hot combustion gases 96 through the turbine section 38, thereby driving rotation of the turbine blades 70 as the hot combustion gases 96 expand through the turbine section 38. As the hot combustion gases 96 drive rotation of the turbine section 38, the turbine shaft 72 rotates the shaft 74 coupled to the compressor shaft 54 and the shaft 76 coupled to the load 40. Accordingly, the turbine section 38 drives rotation of the compressor 50 to compress the intake air 92, while also driving the load 40, such as an electrical generator.

As noted above, the illustrated steam purge system 16 includes the water supply 20, the gas supply 22, and the ejector 18. The water supply 20 may include one or more water tanks 100 and one or more water pumps 102 configured to respectively store and pump a flow of water to the ejector 18. The gas supply 22 may include an atomizing module 103, such as an air atomizing module, configured to facilitate atomization of liquid fuel in the fuel nozzles 60. Accordingly, the gas supply 22, or specifically the atomizing module 103, may further include one or more gas supply components 104 and one or more compressors 106. For example, the compressor 106 may include an air compressor (e.g., an atomizing air compressor) for the atomizing module 103. The gas supply components 104 may include filters, check valves, tanks, pressure regulators, and other flow control equipment. In some embodiments, the gas supply components 104 may include one or more additional heat sources (e.g., heaters or heat exchangers) configured to increase a temperature of the compressed gas from the compressor 106. However, the compressor 106 may be configured to output a compressed gas (e.g., compressed air) with a sufficient pressure and temperature to convert the water to steam in the ejector 18 without any additional heat sources. Although the illustrated embodiment may use a hot compressed air as the gas, in some embodiments, the gas supply 22 may be configured to supply a hot compressed inert gas, such as nitrogen.

The water supply 20 is configured to supply the water to the ejector 18 through a water line 108 having one or more flow control devices, such as a valve 110, a check valve 112, a water tank 114 (e.g., a buffer tank), and a valve 116. For example, the valves 110 and 116 may be rotary valves, gate valves, ball valves, or other suitable actuator-controlled valves, which can be selectively opened and closed in response to control signals from a controller 118. The check valve 112 is configured to block backflow of gas (e.g., hot compressed air) from the gas supply 22 and/or water from the ejector 18 towards the water supply 20. The water tank 114 is configured to provide a buffer of water between the check valve 112 and the valve 116. The valves 110 and 116 are configured to open and close the water flow through the water line 108 from the water supply 20 to the ejector 18.

Similarly, the gas supply 22 is configured to supply a gas flow (e.g., a hot compressed air flow) along a gas line 120 to the ejector 18. The gas line 120 may include one or more flow control devices, such as a valve 122, which is configured to selectively open and close the gas flow in response to a signal from the controller 118. Again, similar to the valves 110 and 116, the valve 122 may be an actuator-controlled valve, such as a ball valve, a gate valve, a rotary valve, or another suitable actuator-controlled valve.

As discussed further below, the water from the water supply 20 and the gas (e.g., hot compressed air) from the gas supply 22 are supplied to the ejector 18, such that the gas mixes with and converts the water to steam in the ejector 18. In particular, the relatively high temperature and pressure of the gas (e.g., hot compressed gas) helps to convert the water into steam in the ejector 18. Additionally, a Venturi effect of the ejector sucks the water into the gas flowing through the ejector 18, thereby facilitating flow of the water and mixing in the ejector 18. As the water-gas mixture (e.g., water-air mixture) mixes and expands in the ejector 18, the change in pressure and the heat transferred from the gas (e.g., hot compressed air) to the water helps to convert the water to steam. In certain embodiments, the initially formed steam in the ejector 18 may not have the desired characteristics for purging the liquid fuel circuit 24 (e.g., the steam may not be immediately a saturated steam). Accordingly, the steam purge system 16 may be configured to address a transition of the steam to a saturated steam prior to purging the liquid fuel circuit 24.

An outlet 124 of the ejector 18 is coupled to an output line 126 having a valve 128, a manifold 130 is coupled to the output line 126, and a plurality of distribution lines 132 are coupled to the manifold 130 and extend to the liquid fuel lines 62 of the liquid fuel circuit 24. Additionally, a vent line 134 is coupled to the output line 126 between the ejector 18 and the valve 128, and the vent line 134 includes a valve 136 and a vent/drain 138. When the controller 118 initiates a steam purge with the steam purge system 16, the water and gas supplied to the ejector 18 may initially generate a steam that is not fully saturated. Accordingly, the controller 118 may control the valve 128 to close and may control the valve 136 to open, thereby blocking the steam from flowing through the output line 126 to the manifold 130 and venting the steam through the vent line 134 to the vent/drain 138. The controller 118 may be configured to perform this initial venting of the steam through the vent line 134 based on a predetermined time delay or other criteria. However, once the controller 118 determines that the steam is or should be a saturated steam, the controller 118 is configured to open the valve 128 and to close the valve 136, thereby stopping the venting of the steam through the vent line 134 and enabling the flow of the steam (now a saturated steam) through the output line 126 to the manifold 130.

The manifold 130 then distributes the saturated steam to the plurality of liquid fuel lines 62 via the distribution lines 132. Each of the distribution lines 132 may include a check valve 140 configured to block backflow of liquid fuel from the liquid fuel line 62 toward the manifold 130 and the ejector 18. Additionally, each of the liquid fuel lines 62 may include a check valve 141 configured to block a backflow of the steam and fuel through the liquid fuel lines 62 toward the liquid fuel supply system 26. Accordingly, when the liquid fuel supply system 26 is not supplying liquid fuel to the fuel nozzle 60 via the liquid fuel circuit 24, the steam purge system 16 supplies the saturated steam through the liquid fuel lines 62 through the entirety of the liquid fuel circuit 24 downstream of the check valves 140 and 141, including the liquid fuel lines 62, the manifolds 66, the fuel nozzles 60, and any other flow control devices along the liquid fuel lines 62. As a result, the saturated steam helps to clean out any residual liquid fuel in the liquid circuit 24 and reduce the possibility of coke formation in the liquid fuel circuit 24.

The steam purge of the liquid fuel circuit 24 by the steam purge system 16 may be performed for a predetermined amount of time at regular intervals or during scheduled maintenance. For example, the steam purge may be performed for 5 to 10 minutes every 1 to 6 months of operation of the gas turbine system 10. Additionally, the steam purge system 16 may be configured to perform the steam purge of the liquid fuel circuit 24 while the gas turbine system 10 is operational, e.g., operating on gas fuel from the gas fuel supply system 28.

In the illustrated embodiment, the steam purge system 16 is at least partially disposed in a housing 142 coupled to an exterior of the gas turbine enclosure 30 at an elevated area 144, which may be disposed at least partially or entirely vertically above the fuel nozzles 60 and/or the combustors 58. Accordingly, the liquid fuel lines 62 passing through the housing 142 may then enter the gas turbine enclosure 30 at an elevated height, such that the liquid fuel lines 62 are inclined downwardly toward each of the combustors 58 and the fuel nozzles 60. In this matter, the liquid fuel may be driven by gravity downward into and through the fuel nozzles 60 and the combustors 58, thereby helping to facilitate steam purging of the liquid fuel in the liquid fuel circuit 24 via gravity.

As illustrated, the liquid fuel lines 62 pass through the housing 142, the check valves 141 are disposed along the liquid fuel lines 62 in the housing 142, the check valves 140 are disposed along the distribution lines 132 in the housing 142, and one or more of the other components of the steam purge system 16 also may be disposed in the housing 142. For example, in certain embodiments, the housing 142 also may contain the manifold 130, the valves 128 and 136, the ejector 18, the valves 110, 112, 116, 122, and the water tank 114. Additionally, in certain embodiments, the housing 142 may contain the gas supply 22 and the liquid fuel supply system 26. In some embodiments, a separate housing 143 (indicated by dashed lines) may house the manifold 130, the valves 128 and 136, the ejector 18, the valves 110, 112, 116, 122, the water tank 114, the gas supply 22, and the liquid fuel supply system 26.

In some embodiments, as discussed below with reference to FIG. 2, the steam purge system 16 may include a plurality of housings 142 each having some of the liquid fuel lines 62 and the corresponding distribution lines 132 and associated components of the steam purge system 16. Again, the liquid fuel lines 62, the check valves 140, the distribution lines 132, and the check valves 141 are disposed at the elevated area 144, such that the saturated steam being provided into the liquid fuel lines 62 gains the benefit of gravity driving the liquid fuel downward through the liquid fuel circuit 24 and out through the fuel nozzles 60 into the combustors 58 during the steam purge. After completion of the steam purge via the steam purge system 16, the gas turbine 10 may then open valves 146 disposed along air purge lines 148 between the compressor 50 and the liquid fuel lines 62 of the liquid fuel circuit 24. The air purge lines 148 are configured to bleed a stream of compressor air off of the compressor 50 to further purge the liquid fuel lines 62 after completion of the steam purge. The air purge lines 148 also include check valves 150 to block a backflow of the liquid fuel and/or the steam through the lines 148 into the compressor 50.

As discussed above, the steam purge system 16 includes the gas supply 22, which may include one or more compressors 106 separate from the compressor 50 of the gas turbine engine 12. For example, as noted above, the gas supply 22 may use an air compressor 106 (e.g., atomizing air compressor) configured to provide an atomizing flow 152 (e.g., an atomizing air flow) through one or more atomizing air flow lines 154 to each of the fuel nozzles 60 in each of the combustors 58. In operation, the atomizing flow 152 is configured to atomize the liquid fuel in the fuel nozzle 60. Accordingly, the gas supply 22, particularly the air compressor 106 of the atomizing module 103, may be used for multiple purposes, including both atomizing the liquid fuel during liquid fuel operation of the gas turbine engine 12 and also producing a hot compressed gas for generating saturated steam in the ejector 18 of the steam purge system 16.

The gas supply 22, such as the air compressor 106, may be configured to provide a suitable temperature and pressure to generate steam (e.g., a saturation steam) in the ejector 18. For example, the air compressor 106 may be configured to supply a hot compressed air flow to the ejector 18 at a temperature of at least equal to or greater than 170, 180, 190, 200, 225, 250, 275, or 300 degrees Celsius, with a pressure of at least equal to or greater than 200, 250, 300, 350, or 400 psi. In some embodiments, the gas supply 22 may also include a bleed flow (e.g., a hot compressed air flow) from the compressor 50 of the gas turbine system 10 and/or a gas supply from another tank or compressor within the facility.

As noted above, the gas turbine system 10 includes the controller 118 configured to control aspects of the steam purge system 16. The illustrated controller 118 includes a processor 156 and memory 158. The memory 158 is configured to store instructions configured to be executed by the processor 156 to operate the steam purge system 16. For example, the controller 118 may be configured to store and execute instructions in accordance with the process illustrated in FIG. 5. In operation, the controller 118 may be configured to open and close the various valves, control operation of dual-fuel system 14, control the generation of saturated steam, control the duration and timing of the steam purge, control the transition between liquid and gas fuel operation of the gas turbine system 10, and control aspects of operation of the gas turbine engine 12.

Figure 2:
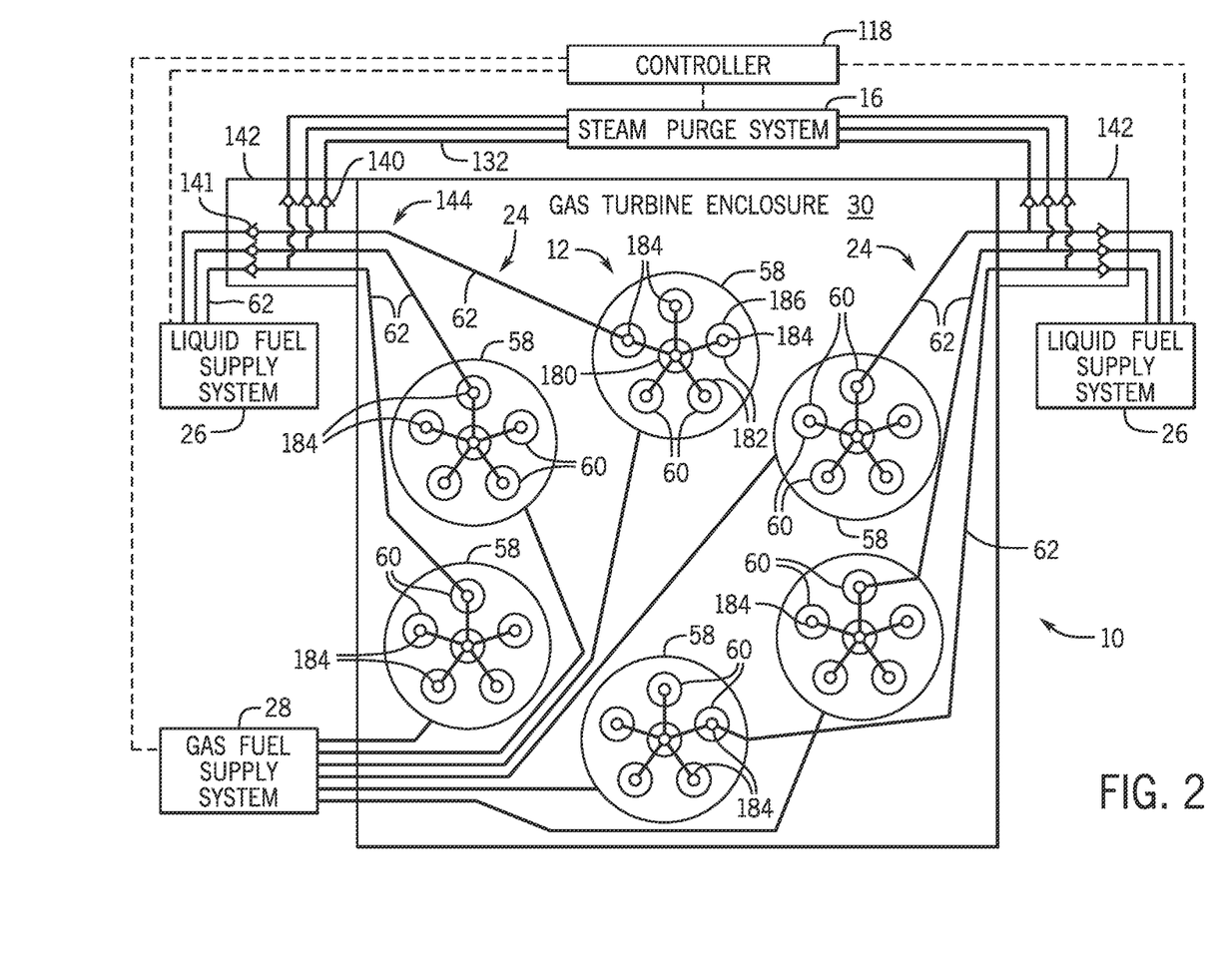
FIG. 2 is a schematic of an embodiment of the gas turbine system of FIG. 1, illustrating the steam purge system coupled to a liquid fuel circuit extending to a plurality of combustors having a plurality of fuel nozzles (e.g., dual-fuel nozzles)

FIG. 2 is a schematic in view of an embodiment of the gas turbine system 10, illustrating a plurality of combustors 58 disposed inside the gas turbine enclosure 30, wherein the steam purge system 16 includes a plurality of housings 142 at the elevated areas 144 on opposite sides of the gas turbine enclosure 30. In particular, in the illustrated embodiment, the housings 142 are disposed on opposite sides of the gas turbine enclosure 30, such that the liquid fuel lines 62 of the liquid fuel supply system 26 and the distribution lines 132 of the steam purge system 16 are evenly divided between the two housings 142. Each of the housings 142 includes three liquid fuel lines 62 configured to receive steam from a corresponding three distribution lines 132 of the steam purge system 16. As illustrated, each of the distribution lines 132 includes a check valve 140 configured to block backflow of liquid fuel into the steam purge system 16, and each of the liquid fuel lines 62 includes a check valve 141 configured to block a backflow of steam into the liquid fuel supply system 26. Additionally, as illustrated, the housings 142 are disposed at the elevated areas 144, such that each of the liquid fuel lines 62 is angled downwardly toward the fuel nozzles 60 in each of the combustors 58 within the gas turbine enclosure 30.

The illustrated embodiment has six combustors 58, each having six fuel nozzles 60. However, any suitable number of combustors 58 and fuel nozzles 60 is within the scope of the disclosed embodiments. The illustrated fuel nozzles 60 are arranged with a central fuel nozzle 180 and five outer or circumferential fuel nozzles 182. The fuel nozzles 60 are also configured with a central liquid fuel cartridge 184 surrounded by a gas fuel supply area 186. Details of these fuel nozzles 60 will be discussed in further detail below with reference to FIG. 4.

Figure 3:
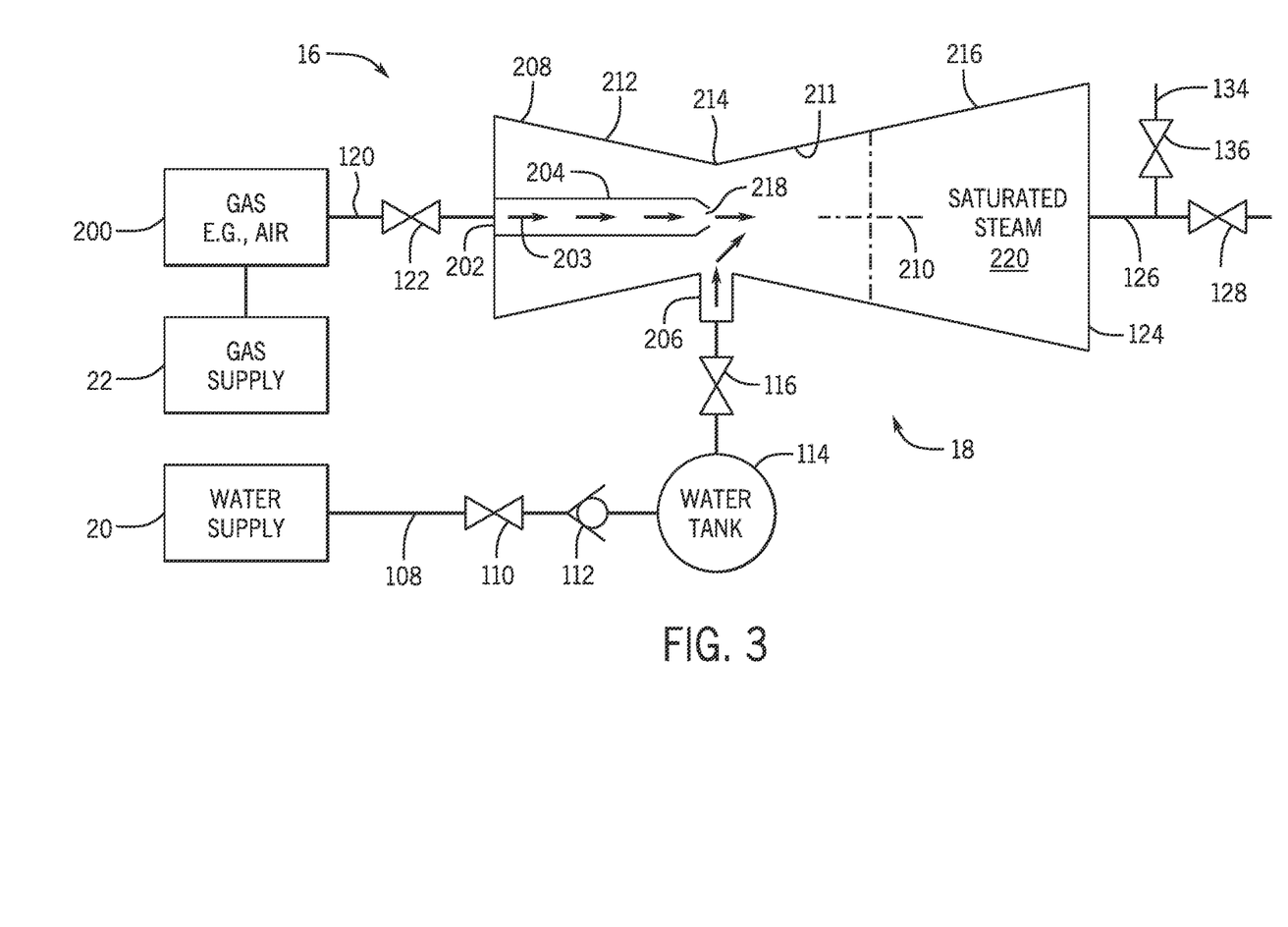
FIG. 3 is a schematic of an embodiment of the ejector of the steam purge system of FIGS. 1-2, illustrating a converging section, a throat, and a diverging section of the ejector.

FIG. 3 is a schematic of an embodiment of the ejector 18 of the steam purge system 16. As illustrated, the ejector 18 receives a gas 200 (e.g., hot compressed air) from the gas supply 22 (e.g., air compressor 106) through the gas line 120 having the valve 122. The ejector 18 receives the gas 200 at a gas inlet 202, which is fluidly coupled to a gas flow path 203 through a central gas conduit 204. The ejector 18 is also coupled to the water supply 20 via the water line 108, which includes the valve 110, the check valve 112, the water tank 114, and the valve 116. The water line 108 is coupled to the ejector 18 at a water inlet 206. The illustrated ejector 18 has an outer wall 208 disposed circumferentially about a central axis 210. For example, the outer wall 208 may be an annular outer wall defining an inner annular chamber 211.

The outer wall 208 may define a converging section 212, a throat 214 downstream from the converging section 212, and a diverging section 216 downstream from the throat 214. Accordingly, the ejector 18 provides a Venturi effect to help draw in the water and mix the water and gas 200 in the ejector 18. The converging section 212, the throat 214, and the diverging section 216 may define annular walls or wall portions of the outer wall 208. For example, the converging section 212 may define a curved annular wall portion or a conical wall portion of the outer wall 208, which gradually decreases in cross-sectional area or diameter in the downstream flow direction (e.g., as indicated by the gas flow path 203) toward the throat 214. In turn, the diverging section 216 may define a curved annular wall portion or conical wall portion of the outer wall 208, which increases in cross-sectional area or diameter from the throat 214 toward the outlet 124 of the ejector 18.

In the illustrated embodiment, the central gas conduit 204 extends at least partially or entirely through the converging section 212 to the throat 214. However, other embodiments may include a shorter or longer length of the central gas conduit 204, such that an outlet 218 of the central gas conduit 204 may be disposed entirely within the converging section 212, directly in throat 214, or in the diverging section 216. Some embodiments also may direct the gas 200 directly into the converging section 212 without use of the central gas conduit 204.

The water inlet 206 is coupled to the outer wall 208 at the throat 214 of the ejector 18. However, in certain embodiments, one or more water inlets 206 may be coupled to the outer wall 208 at locations upstream or downstream from the throat 214. In operation, the flow of the gas 200 through the ejector 18 and particularly through the throat 214 into the diverging section 216 creates a suction that draws in the water through the water inlet 206. Accordingly, the construction of the ejector 18 helps facilitate drawing in the water through the water inlet 206, therefore helping to mix the water with the gas 200 in the throat 214 and the diverging section 216. The relatively high pressure and temperature of the gas 200 also helps to facilitate steam formation as the gas 200 and the water mix within the ejector 18.

For example, after a certain duration of time, the steam being generated within the ejector 18 may become saturated, thereby producing a saturated steam 220 within the ejector 18. Initially, before the steam becomes saturated, the valve 136 may open to vent the steam through the vent line 134, while the valve 128 is closed to block flow of the steam through the output line 126 to the liquid fuel lines 62 as discussed above with reference to FIG. 1. However, after the steam becomes saturated, the valve 136 is closed and the valve 128 is opened by the controller 118, thereby routing the saturated steam 220 through the output line 126 to the liquid fuel lines 62 as discussed above with reference to FIG. 1.

Figure 4:
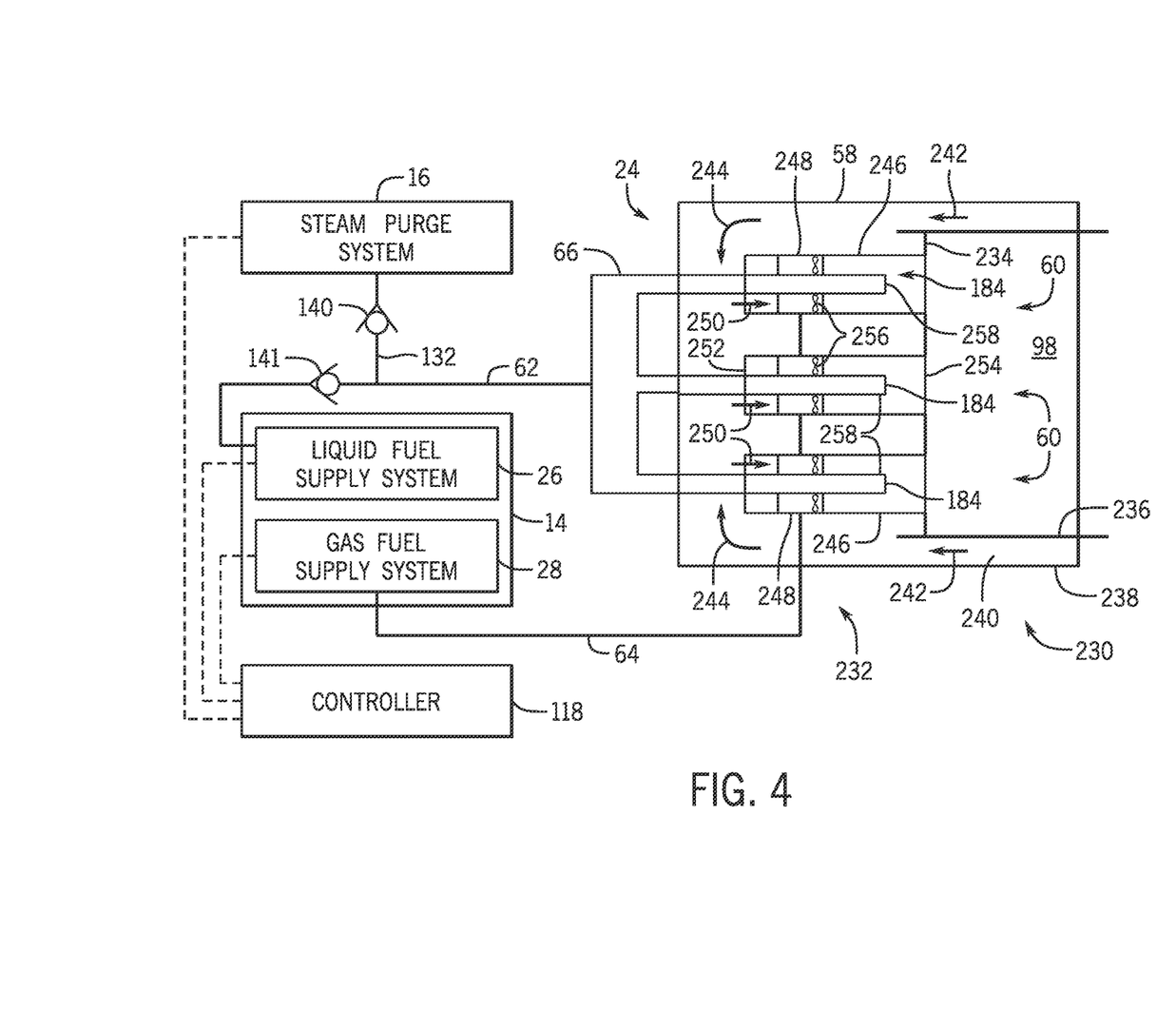
FIG. 4 is a schematic of an embodiment of the steam purge system of FIGS. 1-3 coupled to a combustor having a plurality of fuel nozzles (e.g., dual-fuel nozzles)

FIG. 4 is a schematic of an embodiment of the gas turbine system 10 having the steam purge system 16 coupled to one of the combustors 58 along with the dual-fuel system 14. As illustrated, the dual-fuel system 14 has both the liquid fuel supply system 26 and the gas fuel supply system 28 fluidly coupled to the fuel nozzles 60 of the combustor 58 via the liquid fuel lines 62 and gas fuel line 64. Additionally, the steam purge system 16 is fluidly coupled to the liquid fuel line 62 via the distribution line 132 having the check valve 140. Again, the check valve 140 and the distribution line 132 and the check valve 141 and the liquid fuel line 62 are configured to block backflow through those lines toward the steam purge system 16 and the liquid fuel supply system 26, respectively.

The illustrated combustor 58 has a combustion section 230 and a head end 232. The fuel nozzles 60 are disposed in the head end 232, which is separated from the combustion section by a plate 234. The combustion section 230 includes a combustion liner 236 disposed circumferentially about the combustion chamber 98, and a flow sleeve 238 disposed circumferentially disposed about the combustion liner 236 to define an air flow passage 240. The air flow passage 240 is fluidly coupled to a discharge from the compressor 50, such that the air flow from the compressor flows between the flow sleeve 238 and combustion liner 236 in a flow direction toward the head end 232 as indicated by arrows 242. Upon reaching the head end 232, the air flow turns and enters each of the fuel nozzles 60 as indicated by arrows 244.

Each of the fuel nozzles 60 includes an outer sleeve 246 disposed circumferentially about the liquid fuel cartridge 184, and a plurality of vanes 248 (e.g., swirl vanes) extending radially between the outer sleeve 246 and the liquid fuel cartridge 184. For example, the fuel nozzles 60 may include two to ten vanes 248 spaced circumferentially about the liquid fuel cartridge 184. Each of these vanes 248 is configured to receive gas fuel from the gas fuel lines 64 of the gas fuel supply system 28, thereby directing gas fuel into an air flow path 250 (as indicated by arrows 250) between the outer sleeve 246 and the liquid fuel cartridge 184. The air flow path 250 may be an annular air flow path defined by and between an annular shaped outer sleeve 246 and an annular shaped liquid fuel cartridge 184. The fuel nozzles 60 include an upstream air inlet 252 and a downstream fuel-air mixture outlet 254. Each fuel nozzle 60 is configured to receive the air 244 through the upstream air inlet 252, swirl the air flow with the vanes 248, inject gas fuel through outlets 256 disposed on the vanes 248 (in gas fuel operation), and mix the fuel and air within the outer sleeve 246 before exiting through the fuel-air mixing outlet 254 of the fuel nozzles 60. In liquid fuel operation, the gas fuel is not injected through the outlets 256 of the vanes 248. Instead, the liquid fuel is injected through the liquid fuel cartridge 184 and exits through one or more outlets 258 into the outer sleeve 246. As discussed above with reference to FIG. 1, the liquid fuel cartridge 184 also receives the atomizing flow 152 from the gas supply 22, thereby helping to atomize the liquid fuel exiting from the liquid fuel cartridges 184.

Accordingly, in the illustrated embodiment, the gas turbine system 10 is configured to selectively operate in a liquid fuel operation mode using the liquid fuel supply system 26, the liquid fuel supply lines 62, and the liquid fuel cartridges 184 in the fuel nozzles 60. Additionally, the gas turbine supply system 10 is configured to selectively operate in a gas fuel operation mode using the gas fuel supply system 28, the gas fuel lines 64, and the vanes 248 disposed in the fuel nozzles 60. The steam purge system 16 is configured to purge the liquid fuel circuit 24 when stopping the liquid fuel operation mode with the liquid fuel supply system 26 and/or when changing from the liquid fuel operation mode to the gas fuel operation mode using the gas fuel supply system 28. The steam purge system 16 uses the ejector 18 to combine water and gas (e.g., hot compressed air) to generate steam (e.g., saturated steam) to purge the liquid fuel from the liquid fuel line 62, the manifold 66, the liquid fuel cartridges 184, and various valves and other equipment along the liquid fuel circuit 24.

Figure 5:
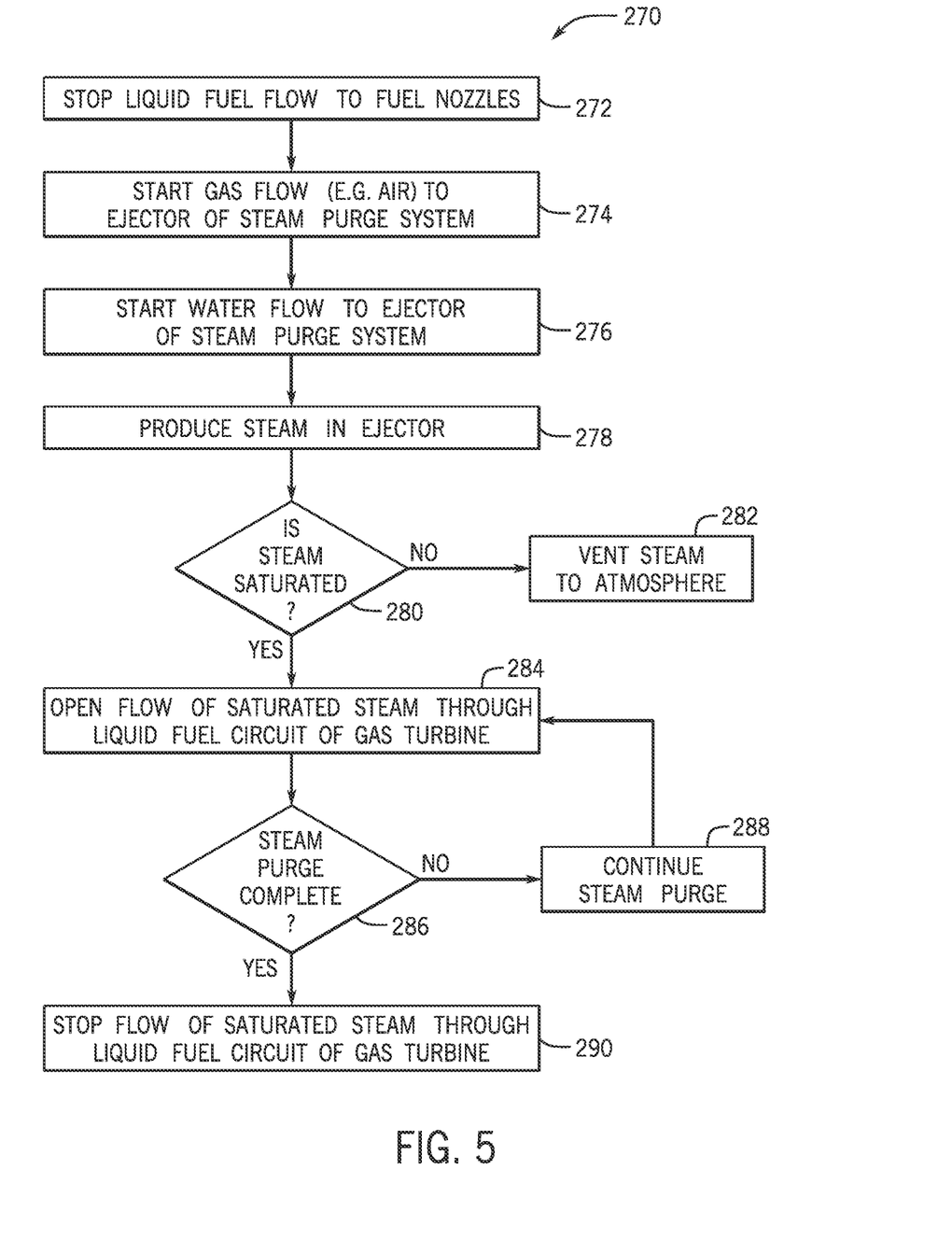
FIG. 5 is a flow chart of an embodiment of a process of purging liquid fuel from a liquid fuel circuit using the steam purge system of FIGS. 1-4.

FIG. 5 is a flow chart of an embodiment of a process 270 for purging the liquid fuel circuit 24 of the gas turbine system 10 with the steam purge system 16. As illustrated, the process 270 may begin by stopping the liquid fuel flow to the fuel nozzles 60 (block 272). For example, the process 270 may be initiating a switch between the liquid fuel operation mode via the liquid fuel supply system 26 and the gas fuel operation mode with the gas fuel supply system 28, or the process 270 may be initiating a general shutdown of the gas turbine system 10. The process 270 then proceeds to start a gas flow (e.g., a hot compressed air flow) to the ejector 18 of the steam purge system 16 (block 274). For example, the process 270 may open the valve 122 along the gas line 120 and enable operation of the gas supply 22, such as the compressor 106 (e.g., air compressor of the atomizing module 103). The process 270 may then start a water flow from the water supply 20 to the ejector 18 of the steam purge system 16 via the water line 108 (block 276). For example, the process 270 may open the valves 110 and 116 and initiate operation of the pump 102 to enable the water flow. The process 270 may then produce steam in the ejector 18 as the water and gas mix within the ejector 18 (block 278).

As the ejector 18 begins to generate steam at block 278, the process 270 may determine whether the steam is saturated at block 280. In certain embodiments, the process 270 may determine whether or not the steam is saturated in block 280 based on a predetermined time (e.g., 5, 10, 15, or 20 minutes), historical data of operation of the gas turbine engine 12, computer models, sensor data regarding operation of the gas turbine engine 12 and the steam purge system 16, and various other parameters. If the steam is not saturated at block 280, then the process 270 vents the steam to atmosphere (block 282) by closing the valve 128 along the output line to 126 and opening the valve 136 along the vent line 134.

If the process 270 (at block 280) determines that the steam is saturated, then the process 270 proceeds to open the flow of saturated steam through the liquid fuel circuit 24 of the gas turbine engine 12, as indicated by block 284. For example, the process 270 may open the valve 128 along the output line 126 and close the valve 136 along the vent line 134, thereby enabling the saturated steam to flow through the manifold 130 into the distribution lines 132 to the liquid fuel lines 62. Further, the process 270 may determine an appropriate duration of time for the steam purge depending on user input, historical data, sensor data, a time since a previous steam purge of the liquid fuel circuit 24, or a predetermined time for the steam purge based on one or more conditions.

At block 286, the process 270 may determine if the steam purge is complete. If the steam purge is not complete, then the process 270 may continue operating the steam purge, as indicated by block 288. If the process 270 determines at block 286 that the steam purge is complete, then the process 270 may then proceed to stop the flow of saturated steam through the liquid fuel circuit 24 of the gas turbine engine 12 (block 290).

Technical effects of the present technology include a steam purge system 16 that generates steam for purging a liquid fuel circuit 24 using an ejector 18, which provides various benefits such as no moving parts, low maintenance, a Venturi effect to draw in the water, etc. The ejector 18 does not require considerable space and leverages the availability a hot compressed gas (e.g., hot compressed air) from an existing source (e.g., atomizing module 103 with air compressor 106) that is already used for another purpose in the gas turbine system 10 (e.g., supplying the atomizing flow 152 for atomizing liquid fuel in the fuel nozzles 60). The steam purge system 16 also uses gravity to facilitate the steam purge of the liquid fuel circuit 24 by placing the liquid fuel lines 62 and distribution lines 132 from the ejector 18 at the elevated area 144 above the combustors 58 and the fuel nozzles 60.

This written description uses examples to disclose the invention, including the best mode, and also to enable any person skilled in the art to practice the invention, including making and using any devices or systems and performing any incorporated methods. The patentable scope of the invention is defined by the claims and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A gas turbine system, comprising:
   an ejector, comprising:
   an outer wall extending circumferentially about a flow path, wherein the outer wall comprises a throat section along the flow path, and a diverging section downstream from the throat section along the flow path;
   a gas inlet configured to supply a gas into the flow path;
   a water inlet configured to supply water into the flow path, wherein the ejector is configured to produce steam in response to the ejector sucking the water into the gas along the flow path;
   a controller configured to control flows of the gas and the water to produce the steam as a saturated steam for a steam purge of a liquid fuel circuit to a combustor of the gas turbine system.

2. The system of claim 1, comprising the liquid fuel circuit fluidly coupled to a steam purge system having the ejector and the controller.

3. The system of claim 2, wherein the steam purge system is disposed an elevated area at least partially above the liquid fuel circuit and outside of an enclosure of the gas turbine system.

4. The system of claim 1, wherein the ejector is configured to produce the saturated steam internally within the ejector along the flow path.

5. The system of claim 1, wherein the controller is configured to control the steam purge based on at least one condition of the steam, wherein the at least one condition comprises whether the steam is the saturated steam.

6. The system of claim 1, wherein the liquid fuel circuit comprises a fuel nozzle of a gas turbine engine, a combustor of the gas turbine engine, a gas turbine fuel system, or a combination thereof.

7. The system of claim 6, comprising the gas turbine engine having the liquid fuel circuit.

8. The system of claim 1, wherein the gas inlet is configured to supply the gas into the ejector lengthwise along a central axis of the ejector along the flow path.

9. The system of claim 8, wherein the water inlet is disposed at the throat section of the ejector, wherein the water inlet is configured to supply the water into the throat section crosswise to the central axis.

10. The system of claim 9, wherein the gas inlet comprises a compressed air inlet, and the gas comprises compressed air.

11. The system of claim 10, comprising an air compressor configured to supply the compressed air to the compressed air inlet.

12. The system of claim 11, wherein the air compressor is configured to supply the compressed air to one or more fuel nozzles to atomize a liquid fuel.

13. The system of claim 1, wherein the controller is configured to vent the steam to atmosphere until the steam becomes the saturated steam and to open a flow of the saturated steam through the liquid fuel circuit.

14. The system of claim 1, wherein the outer wall of the ejector comprises a converging section upstream from the throat section along the flow path wherein the gas inlet is coupled to the converging section, wherein the water inlet is coupled to the throat section.

15. The system of claim 1, comprising a manifold downstream from the ejector, wherein the manifold comprises a plurality of steam supply lines coupled to a respective plurality of liquid fuel lines of the liquid fuel circuit.

16. The system of claim 15, wherein each of the plurality of liquid fuel lines comprises a first check valve configured to block a backflow of the steam, and each of the plurality of steam supply lines comprises a second check valve configured to block a backflow of a liquid fuel.

17. A system, comprising:
a liquid fuel circuit; and
a steam purge system configured to purge the liquid fuel circuit with steam, wherein the steam purge system comprises:
an ejector, comprising:
an outer wall extending circumferentially about a flow path, wherein the outer wall comprises a throat section along the flow path, and a diverging section downstream from the throat section along the flow path;
a gas inlet configured to supply a gas into the flow path; and
a water inlet configured to supply water into the flow path, wherein the ejector is configured to produce the steam in response to mixing of the water and the gas along the flow path; and
a controller configured to vent the steam to atmosphere until the steam becomes a saturated steam and to open a flow of the saturated steam through the liquid fuel circuit.

18. The system of claim 17, comprising a gas turbine enclosure configured to house a gas turbine engine comprising a combustor having a fuel nozzle fluidly coupled to a liquid fuel line of the liquid fuel circuit, wherein the liquid fuel line extends to an elevated area vertically above the combustor and/or the fuel nozzle, and the steam purge system is fluidly coupled to the liquid fuel line at the elevated area.

19. The system of claim 17, wherein the gas inlet comprises a compressed air inlet, and the gas comprises compressed air.

20. A system, comprising:
a liquid fuel circuit;
a gas turbine enclosure configured to house a gas turbine engine comprising a combustor having a fuel nozzle fluidly coupled to a liquid fuel line of the liquid fuel circuit, wherein the liquid fuel line extends to an elevated area vertically above the combustor and/or the fuel nozzle, wherein the elevated area is disposed in a housing outside of the gas turbine enclosure; and
a steam purge system fluidly coupled to the liquid fuel line of the liquid fuel circuit at the elevated area, wherein the steam purge system comprises:
an ejector, comprising:
an outer wall extending circumferentially about a flow path, wherein the outer wall comprises a throat section along the flow path, and a diverging section downstream from the throat section along the flow path;
a gas inlet configured to supply a gas into the flow path;
a water inlet configured to supply water into the flow path, wherein the ejector is configured to produce steam in response to mixing of the water and the gas along the flow path; and
a controller configured to control flows of the gas and the water to produce the steam for a steam purge of a liquid fuel circuit.

* * * * *